Patented May 5, 1925.

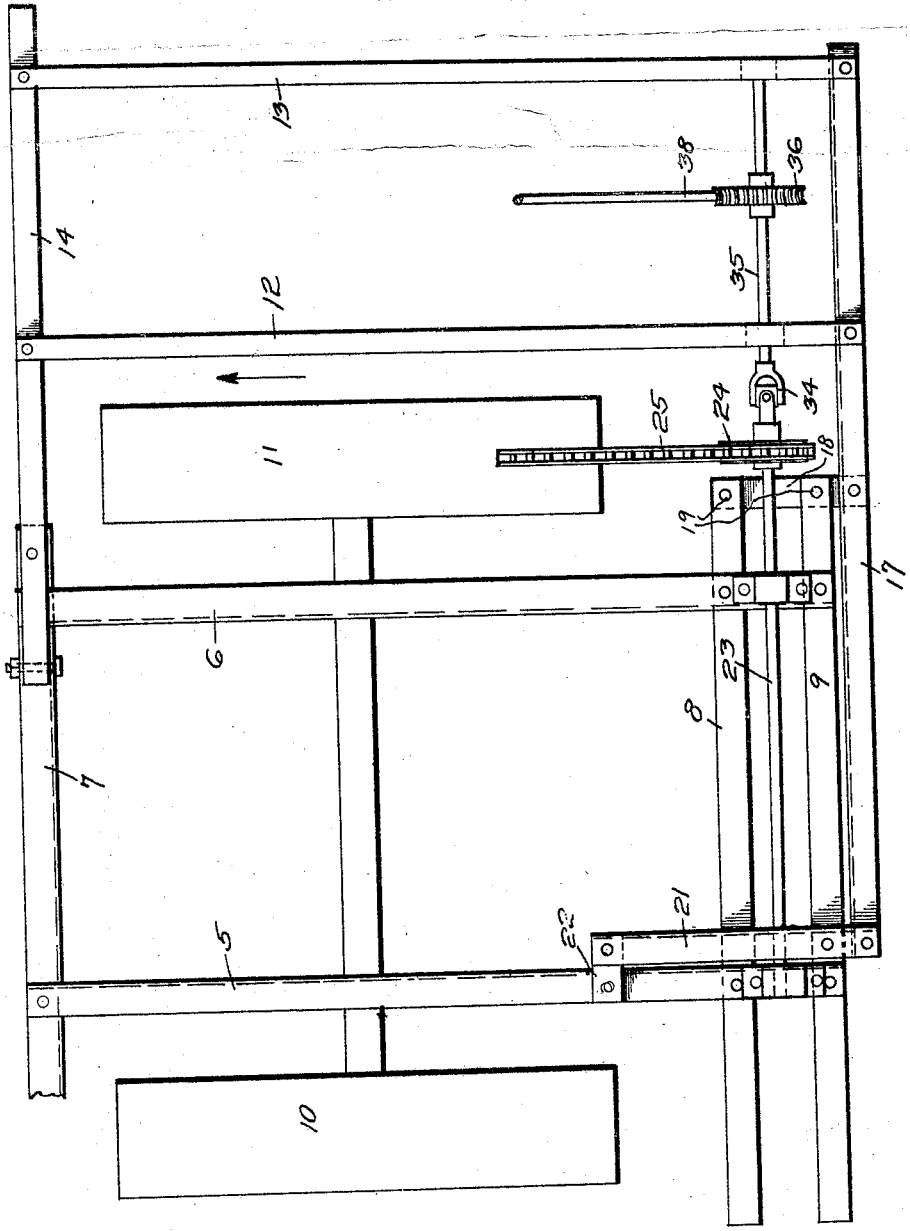

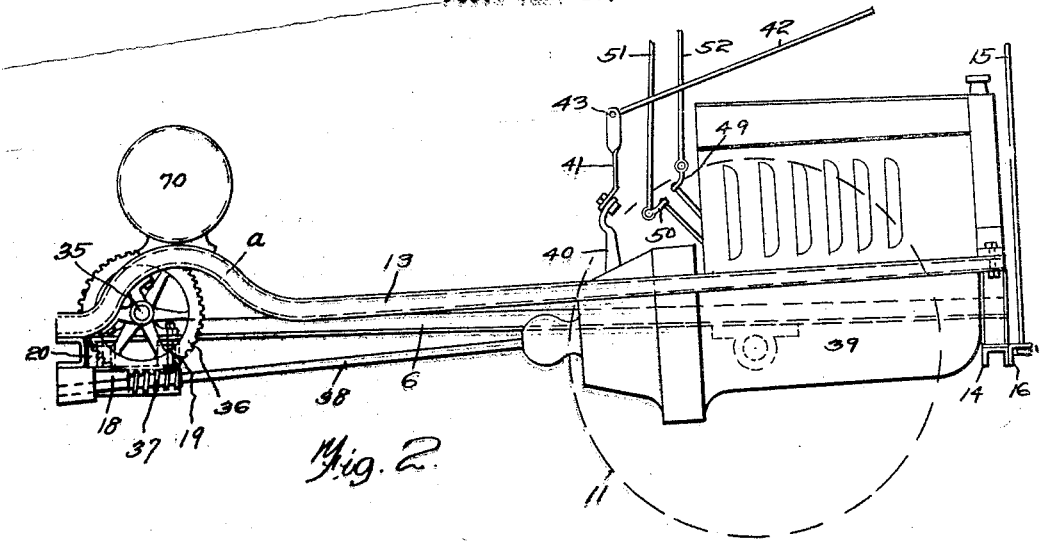
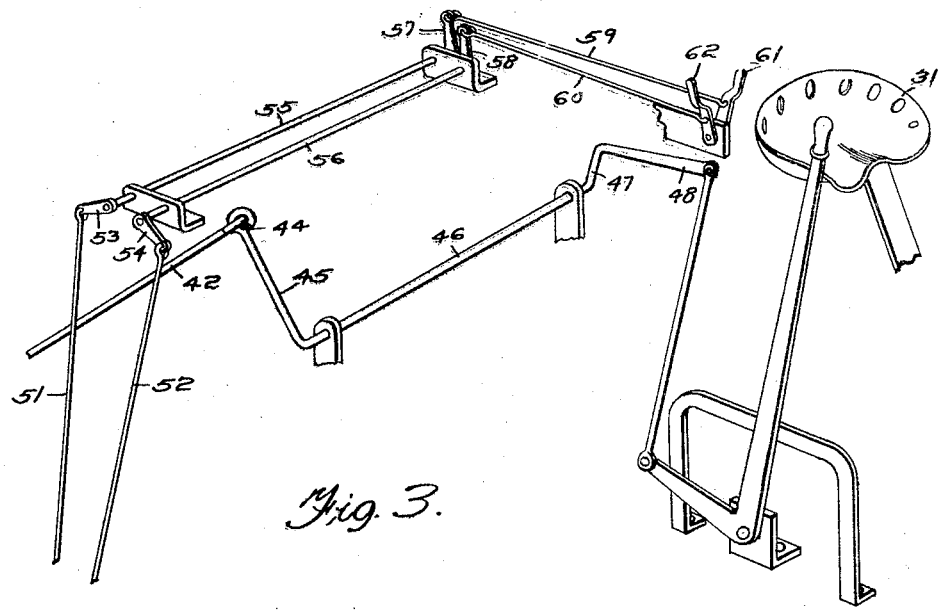

1,537,040

UNITED STATES PATENT OFFICE.

HERMAN J. VIRGENS, OF WELCOME, MINNESOTA.

POWER-UNIT ATTACHMENT FOR AGRICULTURAL MACHINES.

Application filed January 10, 1924. Serial No. 685,427.

*To all whom it may concern:*

Be it known that I, HERMAN J. VIRGENS, a citizen of the United States, residing at Welcome, in the county of Martin and State of Minnesota, have invented certain new and useful Improvements in Power-Unit Attachments for Agricultural Machines, of which the following is a specification, reference being had therein to the accompanying drawings.

This invention relates to a power unit attachment for horse drawn agricultural machines such as corn husking machines.

In the best known type of corn husking machines at present on the market the machines are drawn by horse power and the necessary gearing is interposed between the ground or bull wheels of the machine and the remainder of the mechanism whereby the several instrumentalities which operate upon the ears of corn are driven from said bull wheels. The machines in question are quite large and heavy and since it is necessary to drive a plurality of mechanism such, for example, as stripping rolls, husking rolls, conveyors and the like, it follows that the horse power required is very considerable. It is, therefore, a primary object of the present invention to provide a power unit in the form of an internal combustion engine and to mount it upon the machine in such manner as to cause it to act as an auxiliary power unit by means of which the number of horses required to operate the machine may be reduced and the apparatus as a whole may be more easily handled. This is accomplished by causing the power unit or engine to drive the mechanism leaving only the work of drawing the machine over the ground to be performed by the horses.

One of the difficulties experienced with the machines which rely wholly upon draft animals as motive power for both the bodily movement of the machine and the driving of its mechanism is that if the mechanism becomes clogged by the material being operated upon, there is no way of continuing the operation of the mechanism except by the forward movement of the machine which feeds more material into the machine and is likely to aggravate the clogging action.

By my improved arrangement the mechanism of the machines may, in case of clogging, be continued in operation under the influence of the engine alone, with the horses stopped, until the mechanism is cleared.

In the machines of the character indicated at present on the market the parts are so arranged that most of the weight is thrown upon the left-hand bull wheel. I contemplate mounting the engine constituting the auxiliary power unit outside of the right-hand bull wheel and thus utilize its weight to counter-balance the remainder of the structure and equalize the weight on the two bull wheels.

Other objects and advantages of the invention will be set forth in the detailed description which follows:

In the accompanying drawings:

Fig. 1 is a plan view of a part of the main frame of a horse drawn machine with the auxiliary frame upon which the power unit is to be mounted associated therewith;

Fig. 2 is a side elevation of the auxiliary power unit and auxiliary frame; and

Fig. 3 is a perspective view of the controls of the auxiliary power unit by which the engine and its clutch is rendered controllable from the driver's seat of the machine.

Like numerals designate corresponding parts in all of the figures of the drawing.

The main frame of the machine comprises longitudinally extending angle irons 5 and 6 and transverse angle irons 7, 8 and 9. The bull wheels are indicated at 10 and 11. I mount outside of the right-hand bull wheel an auxiliary frame comprising the longitudinally extending channels 12 and 13 and the transverse channel 14 upon which the forward ends of the channels 12 and 13 are supported. The transverse frame member 14 is secured at its inner end to the transverse angle 7, if desired its outer end may be further supported by a truss rod 15, see Fig. 2, which passes through an L-shaped plate 16 secured to the transverse channel 14.

The rear ends of the longitudinally extending channels 12 and 13 of the auxiliary frame are supported upon a transverse channel iron 17. This channel iron is, in turn, supported by a short section of angle iron 18, bolted, as indicated at 19, to the existing transverse angle irons 8 and 9; suitable filling blocks 20 being placed inside of these angle irons at the points where the bolts pass through. That end of the channel iron 17 remote from the auxiliary frame is supported by being secured to the under side of an angle iron 21 which rests upon and is secured to the angle irons 8 and 9, is extended forwardly and is secured to the angle iron 5 by a strap 22. The main drive shaft of the main drive machine is indicated at 23. This main drive shaft drives through sprocket wheels 24 and sprocket chain 25 to the conventional mechanism of the machine. This main drive shaft is connected by a universal joint 34 with a shaft section 35 having a worm wheel 36 mounted thereon, the latter being driven by a worm 37 upon the drive shaft 38 of an internal combustion engine 39. This engine has its mounting upon the auxiliary frame consisting of the parts, 12, 13, 14 and 17. It will be apparent from an inspection of Fig. 1 that this motor is supported outside of the right-hand bull wheel and thus counterbalances the weight of the heaviest part of the mechanism which is usually located over the left-hand bull wheel.

I prefer to provide means by which the throttle and spark controls of the engine and the clutch of the engine may be made operable from the driver's seat 31. Numerous ways will readily suggest themselves for connecting the operating levers, disposed adjacent the driver's seat, to these parts. I have illustrated such means in Fig. 3 though it is to be understood that any suitable mechanism may be provided for this purpose. In carrying out this thought I secure to the clutch pedal, indicated at 40, an extension strap 41 to which a rod 42 is pivoted at 43. The outer end of this rod is provided with an eye 44 through which a bent end of an arm 45 passes. This arm constitutes a crank which is carried by a shaft 46 and the opposite end of which shaft is bent to form a crank 47 and lever 48. Lever 48 is connected by a link 48ª with the bent end 48ᵇ of an operating handle 48ᶜ. It is manifest that by pressing rearwardly on handle 48ᶜ the rod 42 will be drawn upon to move the clutch pedal forwardly and thus disengage the clutch. The spark and throttle levers of the engine are indicated, respectively, at 49 and 50 and these are connected by rods 51 and 52 to the crank arms 53 and 54 on shafts 55 and 56. Crank arms 57 and 58 at the opposite ends of said shafts are connected by pull rods 59 and 60 with operating levers 61 and 62 disposed adjacent the driver's seat.

It will be noted that the angle irons 12 and 13 are arched adjacent their rear ends, as indicated at $a$. I utilize these arched portions as a mounting for the gasoline tank 70 and thus elevate this tank enough to get the desired gravity feed to the motor.

It is to be understood that the invention is not limited to the precise construction set forth but that it includes within its purview whatever changes fairly come within either the terms or the spirit of the appended claims.

Having described my invention what I claim is:

1. The combination with a horse drawn machine, comprising a pair of bull wheels, a supporting frame between said bull wheels, an auxiliary power unit, means for mounting said power unit outwardly of the right hand bull wheel, a driven element upon the supporting frame and driving connections between said element and the auxiliary power unit, whereby said driven element may be driven independently of the bull wheel and from a point outwardly of said bull wheel.

2. In combination with a horse drawn machine, of an auxiliary power unit for the mechanism thereof and driving mechanism between the power unit and the mechanism of the machine comprising a worm, a worm wheel, a shaft upon which the worm wheel is mounted and a universal joint between the shaft and the main drive shaft of the machine.

3. The combination with a horse drawn machine and its main frame, of an auxiliary frame secured thereto and extending outside of the right-hand bull wheel of the machine, an internal combustion motor mounted upon the auxiliary frame and comprising a clutch controlling member and longitudinally extending drive shaft, a transverse main shaft for the machine, a worm drive between the longitudinal drive shaft of the motor and the said transverse main shaft of the machine.

4. In an auxiliary power plant for horse drawn machine, the combination with the machine frame, of an auxiliary frame supported therefrom outside of the right-hand ground wheel of the machine, said machine comprising a transversely disposed main drive shaft, a transverse shaft in alignment with the main drive shaft, a connection between said shafts, an internal combustion engine having a longitudinally extending drive shaft, said internal combustion engine being supported upon the auxiliary frame, a worm drive between said longitudinally extending drive shaft and the last named transversely extending shaft.

In testimony whereof I hereunto affix my signature.

HERMAN J. VIRGENS.